(12) United States Patent
Kern et al.

(10) Patent No.: US 10,630,063 B2
(45) Date of Patent: Apr. 21, 2020

(54) HEAT-CONDUCTING CERAMIC BUSHING FOR SWITCHGEAR

(71) Applicant: SIEMENS AKTIENGESELLSCHAFT, Munich (DE)

(72) Inventors: Stefan Kern, Frankfurt am Main (DE); Michael Leitner, Oberursel (DE); Max Sandke, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/304,311

(22) PCT Filed: Apr. 25, 2017

(86) PCT No.: PCT/EP2017/059701
§ 371 (c)(1),
(2) Date: Nov. 26, 2018

(87) PCT Pub. No.: WO2017/202559
PCT Pub. Date: Nov. 30, 2017

(65) Prior Publication Data
US 2019/0139682 A1     May 9, 2019

(30) Foreign Application Priority Data
May 25, 2016 (DE) .......... 10 2016 209 134

(51) Int. Cl.
*H02G 5/06*     (2006.01)
*H02B 1/56*     (2006.01)
*H01B 17/30*    (2006.01)
*H02G 5/10*     (2006.01)
*H02B 13/00*    (2006.01)
*H02B 13/035*   (2006.01)

(52) U.S. Cl.
CPC ............ *H02G 5/068* (2013.01); *H01B 17/30* (2013.01); *H02B 1/56* (2013.01); *H02B 13/00* (2013.01); *H02B 13/0358* (2013.01); *H02G 5/10* (2013.01)

(58) Field of Classification Search
CPC ...... H02B 1/305; H02B 1/56; H02B 13/0358; H02B 13/045; H01B 17/30; H02G 3/22; H02G 5/068; H02G 5/10
USPC ................................................ 361/600–621
See application file for complete search history.

(56) References Cited

U.S. PATENT DOCUMENTS 3,621,109 A * 11/1971 Roy Nakata ........... H02G 5/066
                                                    174/16.2
6,031,710 A    2/2000 Wolf et al.
8,124,874 B2 * 2/2012 Blatter .................. H02G 5/068
                                                    174/139
(Continued)

FOREIGN PATENT DOCUMENTS

CN         1198030 A     11/1998
CN       201623396 U     11/2010
(Continued)

*Primary Examiner* — Zachary Pape
(74) *Attorney, Agent, or Firm* — Laurence Greenberg; Werner Stemer; Ralph Locher

(57) ABSTRACT

A bushing for switchgear is composed of an outer metal ring, a current-conducting element and a disk-shaped ceramic insulating element which can be mounted in a floating manner in the outer metal ring. There is also described a switchgear with such a bushing.

20 Claims, 3 Drawing Sheets

(56) References Cited

U.S. PATENT DOCUMENTS

| | | |
|---|---|---|
| 8,426,730 B2 | 4/2013 | Widmer et al. |
| 8,552,297 B2* | 10/2013 | Sologuren-Sanchez ..................... H02G 5/068 174/137 R |
| 2004/0029443 A1 | 2/2004 | Quadir et al. |
| 2014/0174787 A1* | 6/2014 | Zant ....................... H01B 13/06 174/111 |
| 2016/0049781 A1 | 2/2016 | Nisslbeck et al. |
| 2016/0071634 A1* | 3/2016 | Halleraker .......... E21B 33/0385 174/668 |

FOREIGN PATENT DOCUMENTS

| | | |
|---|---|---|
| DE | 19516831 A1 | 11/1996 |
| DE | 19819797 A1 | 12/1998 |
| DE | 102008000494 A1 | 9/2009 |
| DE | 202009007819 U1 | 10/2009 |
| DE | 102013215760 A1 | 2/2015 |
| DE | 102014200762 A1 | 7/2015 |
| DE | 102015215384 A1 | 2/2016 |
| EP | 0810705 A2 | 12/1997 |
| EP | 1511146 A2 | 3/2005 |
| EP | 2131371 A1 | 12/2009 |
| GB | 1133270 A | 11/1968 |
| WO | 2010018035 A1 | 2/2010 |

\* cited by examiner

HEAT-CONDUCTING CERAMIC BUSHING FOR SWITCHGEAR

BACKGROUND OF THE INVENTION

Field of the Invention

The invention relates to an electrical bushing for switchgear assemblies, in particular gas-insulated switchgear assemblies, and to switchgear assemblies having such an electrical bushing.

Cast resin bushings which are arranged between metallic encapsulations of a gas-insulated switchgear assembly are known from the prior art.

Such cast resin bushings require that the degree of heat exchange between two containers between which such a bushing is arranged is very small. The small degree of heat exchange between the containers is based on the low thermal conductivity of the cast resin bushing of approximately 0.8 to 1.1 watt per meter-kelvin. Owing to the small degree of heat exchange, it is not possible to dissipate heat from local hotspots into cooler regions of the installation.

The relatively high thermal conductivity of aluminum oxides and aluminum nitrides is also known from the prior art; however, owing to the requirement for the insulation capacity, capacity for mechanical loading and processability of the materials, for example for introducing control electrodes, aluminum oxides and aluminum nitrides cannot be produced cost-effectively and the use of such ceramic bushings is associated with a very high degree of complexity.

Bushings which contribute to the partitioning of gas compartments also need to be gas-tight. Partitioning of gas compartments results in the possibility that adjoining gas compartments can be maintained and separate regions of the installation can have different pressures and only minimal quantities of gas escape from the installation.

DE 10 2013 215 760 A1 discloses ceramic insulation elements for switchgear assemblies without addressing the special requirements for bushings.

DE 195 16 831 A1 discloses an X-ray tube having a ceramic bushing which has a higher thermal conductivity than a cast resin bushing, but this document does discuss the mechanical requirements or the need for positioning of control electrodes.

SUMMARY OF THE INVENTION

The object of the invention now consists in eliminating the mentioned disadvantages from the prior art and providing a bushing which has higher thermal conductivity than a cast resin bushing and which meets the mechanical and electrical requirements.

The object is achieved by the invention of the independent claim and the claims dependent thereon.

In one exemplary embodiment, the electrical bushing according to the invention for switchgear assemblies, in particular a gas-insulated switchgear assembly, is constructed from a multi-part metallic outer ring or a single-part metallic outer ring and a single-part or multi-part form-fitting insert ring, a current conduction element, a disk-shaped insulating element consisting of a ceramic material (referred to below as ceramic disk-shaped insulating element), preferably having a first sealing element and an opening for receiving the current conduction element, preferably a form-fitting insert ring having at least one insert segment, preferably a second sealing element, a fastening element, to be precise in such a way that the ceramic disk-shaped insulating element is connectable to the metallic outer ring, the ceramic disk-shaped insulating element has an outer diameter face, an inner diameter face and two outer faces, the current conduction element is connectable to the ceramic disk-shaped insulating element via a fastening element, and the ceramic disk-shaped insulating element is mountable or is mountable in floating fashion by means of the multi-part metallic outer ring or the single-part metallic outer ring and the form-fitting insert ring. The electrical bushing has a current conduction element for the transport of current through the bushing.

In the embodiment having a multi-part metallic outer ring, the ceramic disk-shaped insulating element is preferably mounted between two parts of the multi-part metallic outer ring and further preferably is mounted with a seal in such a way that the ceramic disk-shaped insulating element is mounted, in particular is mounted in floating fashion, in gas-tight fashion in the multi-part metallic outer ring. The multi-part metallic outer ring can be split in the axial direction, with the result that the multi-part metallic outer ring consists of two or more metallic rings, or the multi-part metallic outer ring can be split in the radial direction, with the result that the multi-part metallic outer ring consists of metallic ring segments. The ceramic disk-shaped insulating element is then either mounted or mounted in floating fashion between the metallic rings which form the metallic outer ring or mounted or mounted in floating fashion in the metallic ring segments which can be assembled to form the metallic outer ring. The term "split" should in this case be understood to mean that the metallic outer ring is divided into a plurality of parts; these parts do not need to originate from one part, but can also have been manufactured from a plurality of parent parts.

In the embodiment having a multi-part metallic outer ring which is split in the axial direction, the metallic rings forming the metallic outer ring are preferably connected to one another by means of a bayonet lock, a combination of an internal thread and an external thread or by means of screws, and thus the ceramic disk-shaped insulating element is mountable or is mountable in floating fashion in the assembled metallic outer ring.

In the embodiment having a multi-part metallic outer ring which is split in the radial direction, the metallic ring segments forming the metallic outer ring are preferably connected to one another by means of screws or pins, and thus the ceramic disk-shaped insulating element is mountable or is mountable in floating fashion in the assembled metallic outer ring.

In the embodiment having a single-part form-fitting insert ring, the form-fitting insert ring is preferably fastened in the metallic outer ring by means of a bayonet lock, and thus the ceramic disk-shaped insulating element is mountable or is mountable in floating fashion between the metallic outer ring and the form-fitting insert ring.

In the embodiment having a multi-part form-fitting insert ring, the form-fitting insert ring preferably engages in the metallic outer ring in such a way that the ceramic disk-shaped insulating element is mountable or is mountable in floating fashion between the metallic outer ring and the multi-part form-fitting insert ring.

It is further preferred that the ceramic disk-shaped insulating element is mountable or is mountable in floating fashion by means of the form-fitting insert ring, the at least one insert segment and the metallic outer ring.

Preferably, the ceramic disk-shaped sealing element is connected or connectable in gas-tight fashion to the metallic outer ring.

It is also preferred that the current conduction element is connectable, in particular is connectable in gas-tight fashion, to the ceramic disk-shaped insulating element via a second sealing element and a fastening element.

By virtue of the metallic outer ring, in particular an outer ring consisting of aluminum, and the above-described construction of the electrical bushing, the outer diameter of the ceramic disk-shaped insulating element is reduced in comparison with solid ceramic bushings. Owing to an opening which is as large as possible, in particular in the center of the ceramic disk-shaped insulating element, for passing through the current conduction element, the use of materials is further reduced. At the same time, a large opening in the ceramic disk-shaped insulating element improves the area for heat transfer between current conduction element and the ceramic disk-shaped insulating element. The combination of a form-fitting insert ring with at least one insert segment and the ceramic disk-shaped insulating element also makes it possible for the ceramic disk-shaped insulating element to be received in floating fashion in the metallic outer ring. This can also be effected by a multi-part metallic outer ring, as a result of which the form-fitting insert ring is not necessary in order to effect floating mounting of the ceramic disk-shaped insulating element. As a result, a large proportion of the forces acting on the ceramic disk-shaped insulating element, such as, for example, forces resulting from the weight of the main conducting path, electromotive forces in the event of short circuits, switching forces, screwing forces and forces resulting from oscillations, are absorbed by the metallic outer ring. As a result, the only remaining forces acting on the ceramic disk-shaped insulating element are now forces which are manageable, for example owing to the thickness of the ceramic disk-shaped insulating element. Thus, owing to the floating mounting and sufficient wall thickness of the ceramic disk-shaped insulating element, a high resistance to breakage forces is achieved.

The metallic outer ring furthermore enables heat exchange between the containers between which it is fitted.

The at least one insert segment in this case, in one exemplary embodiment, consists of a segment of a circle which has the radius of curvature of the form-fitting insert ring and is suitable for closing the defect(s) existing in the insert ring, and, per insert segment, of at least one, preferably two or more connecting elements, which are suitable for producing a connection between the insert ring and the insert segment.

The insert ring can be formed in one or more parts.

It is preferred that the ceramic disk-shaped insulating element has a groove in the inner diameter face, and a ring-shaped field control element is receivable in the groove.

It is also preferred that the ceramic disk-shaped insulating element has, in both outer faces, a ring-shaped notch in that region of the ceramic disk-shaped insulating element in which the three interfaces of an insulating gas, the current conduction element or the fastening element or the union nut and the ceramic disk-shaped insulating element meet. This point at which the three interfaces meet is also referred to as the triple point.

It is also preferred that one or both outer faces of the ceramic disk-shaped insulating element has or have one or more wave contours. These wave contours serve to extend leakage paths and thus increase the dielectric strength of the bushing. The outer faces are understood to mean the same faces which the ring-shaped notches can also have, i.e. the faces facing the gas compartments and not the faces facing the metallic outer ring or the current conduction element.

It is further preferred that the current conduction element is fastened in the ceramic disk-shaped insulating element by means of a union ring as fastening element.

In particular, it is preferred that the union ring has an internal thread, which is screwable to an external thread on the circumference of the current conduction element. Alternatively, the union ring can also form, with the current conduction element, a bayonet lock.

It is also preferred that control geometries are provided on one or more of the following edges:
  a first control geometry on an inner edge, opposite the form-fitting insert ring, of the metallic outer ring,
  a second control geometry on an outer edge, opposite the edge with the fastening element, of the current conduction element,
  a third control geometry on that edge of the fastening element or the union ring which points towards the metallic outer ring and away from the ceramic disk-shaped insulating element, and
  a fourth control geometry on the form-fitting insert ring and on the one or more insert segments on the edge which points away from the metallic outer ring and the ceramic disk-shaped insulating element, respectively.

Control geometries are in this case physical structures which enable in particular control and/or influencing of electrical and/or electromagnetic fields.

It is also preferred that the outer faces of the ceramic disk-shaped insulating element are polished or glazed, and the outer circumference and inner circumference are machined by grinding. In this case, it should be noted that the opening forming the inner circumference can be produced by grinding. The groove which is optionally arranged in the inner circumference can be produced by grinding when the opening which forms the inner circumference is produced or in an additional working step.

It is also preferred that the metallic outer ring is formed from aluminum or an aluminum alloy or stainless steel.

It is further preferred that the current conduction element is formed from copper or a copper alloy or aluminum or an aluminum alloy.

It is also preferred that the ceramic disk-shaped insulating element is formed from aluminum oxide, preferably $Al_2O_3$, or aluminum nitride, AlN. It is particularly preferred that the ceramic disk-shaped insulating element is formed from high-purity aluminum oxide, preferably $Al_2O_3$, or high-purity aluminum nitride, AlN, wherein high-purity is understood to mean a proportion of at least 99% of the respective material.

It is also preferred that the ceramic disk-shaped insulating element is formed from beryllium oxide or boron nitride or magnesium oxide or silicon aluminum oxynitride or silicon carbide or silicon nitride or titanium nitride or titanium oxide or a so-called mullite ceramic, a mixed form of aluminum oxide and silicon oxide.

It is also preferred that the metallic outer ring has, on its outer circumference, one or more heat sinks, which extend(s) radially away from the outer circumference. The heat sink(s) can in this case be separate heat sinks which are connected or are connectable to the metallic outer ring or else are integrated in the metallic outer ring.

It is likewise preferred that grooves for receiving sealing elements, in particular the first and second sealing elements, are provided in metallic component parts. In particular, it is preferred that the current conduction element has a groove for receiving a second sealing element in such a way that the current conduction element is connectable in gas-tight fashion to the ceramic disk-shaped insulating element, and/or the metallic outer ring has a groove for receiving a first sealing element in such a way that the ceramic disk-shaped insulating element is connectable in gas-tight fashion to the metallic outer ring.

It is further preferred that the electrical bushing is gas-tight.

It is further preferred that a switchgear assembly for low-voltage installations or medium-voltage installations or high-voltage installations having an electrical bushing according to one or more of the preceding embodiments.

It is also preferred that a switchgear assembly for low-voltage installations or medium-voltage installations or high-voltage installations having an electrical bushing according to one or more of the preceding embodiments, wherein at least part of the switchgear assembly is filled or is fillable with an insulating gas.

BRIEF DESCRIPTION OF THE SEVERAL VIEWS OF THE DRAWING

The subject matter of the invention will be explained in more detail below with reference to figures.

DESCRIPTION OF THE INVENTION

Figure 1:
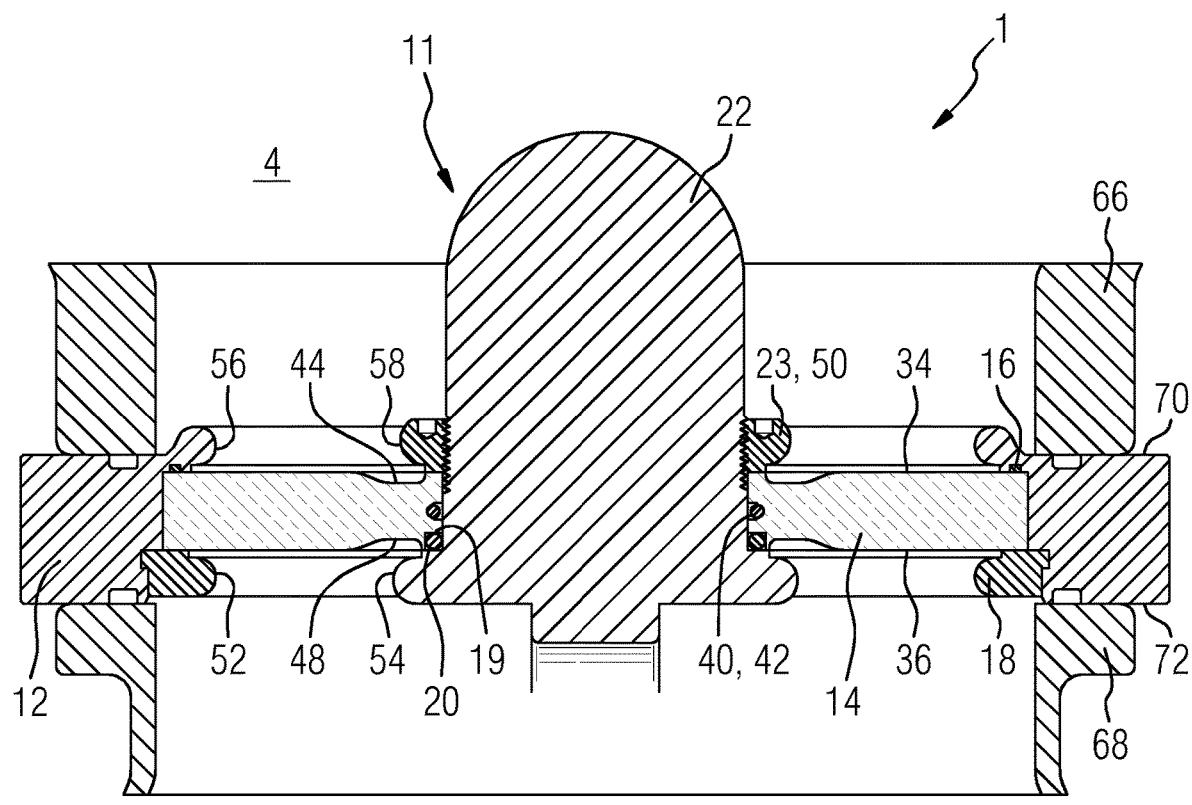
FIG. 1 shows a section through an electrical bushing according to the invention which is arranged between two containers of a gas-insulated switchgear assembly.

FIG. 1 shows an electrical bushing 11 according to the invention in a gas-insulated switchgear assembly 1 indicated by the two containers 66, 68.

In this case, the electrical bushing 11 is formed by a current conduction element 22, which is held in a ceramic disk-shaped insulating element 14 by means of a fastening element 23, and can be gas-tight owing to a second sealing element 20, which is optionally mountable in a groove 19. The groove 19 can alternatively be provided in the current conduction element 22 (not shown in FIG. 1) or in the ceramic disk-shaped insulating element 14. The ceramic disk-shaped insulating element 14 is insertable into a metallic outer ring 12 and is mountable in floating fashion in the metallic outer ring 12 by means of an insert ring 18 and by means of an insert segment (not shown here).

The metallic outer ring 12 has two connecting faces 70, 72, via which it is connectable to the respective containers of the gas-insulated switchgear assembly 66, 68.

The ceramic disk-shaped insulating element 14 in this example has an optional groove 40, in which an optional ring-shaped field control element 42 is received.

In order to achieve or increase the dielectric strength, in the electrical bushing 11 shown optional control geometries 52, 54, 56, 58 are provided. A first control geometry 56 is arranged on the metallic outer ring 12.

A second control geometry 54 is provided on the current conduction element 22 on a widened portion, which prevents the current conduction element 22 from sliding through the ceramic disk-shaped insulating element 14.

A third control geometry 58 is provided on the fastening element 23 or on a union nut 50.

A fourth control geometry 52 is provided on the form-fitting insert ring 18 and at least one insert segment 24, 26 (not shown in FIG. 1).

The control geometries shown here can in each case all be implemented or else only individually, or even not at all.

In order to further increase the dielectric strength, a ring-shaped notch 44, 48 can optionally also be provided in one or both outer faces 34, 36 of the ceramic disk-shaped insulating element 14.

These notches 44, 48 are preferably arranged in that region of the ceramic disk-shaped insulating element 14 in which the three interfaces of the insulating gas 4, the current conduction element 22 or the fastening element 23 or the union nut 50 and the ceramic disk-shaped insulating element 14 meet.

Figure 2:
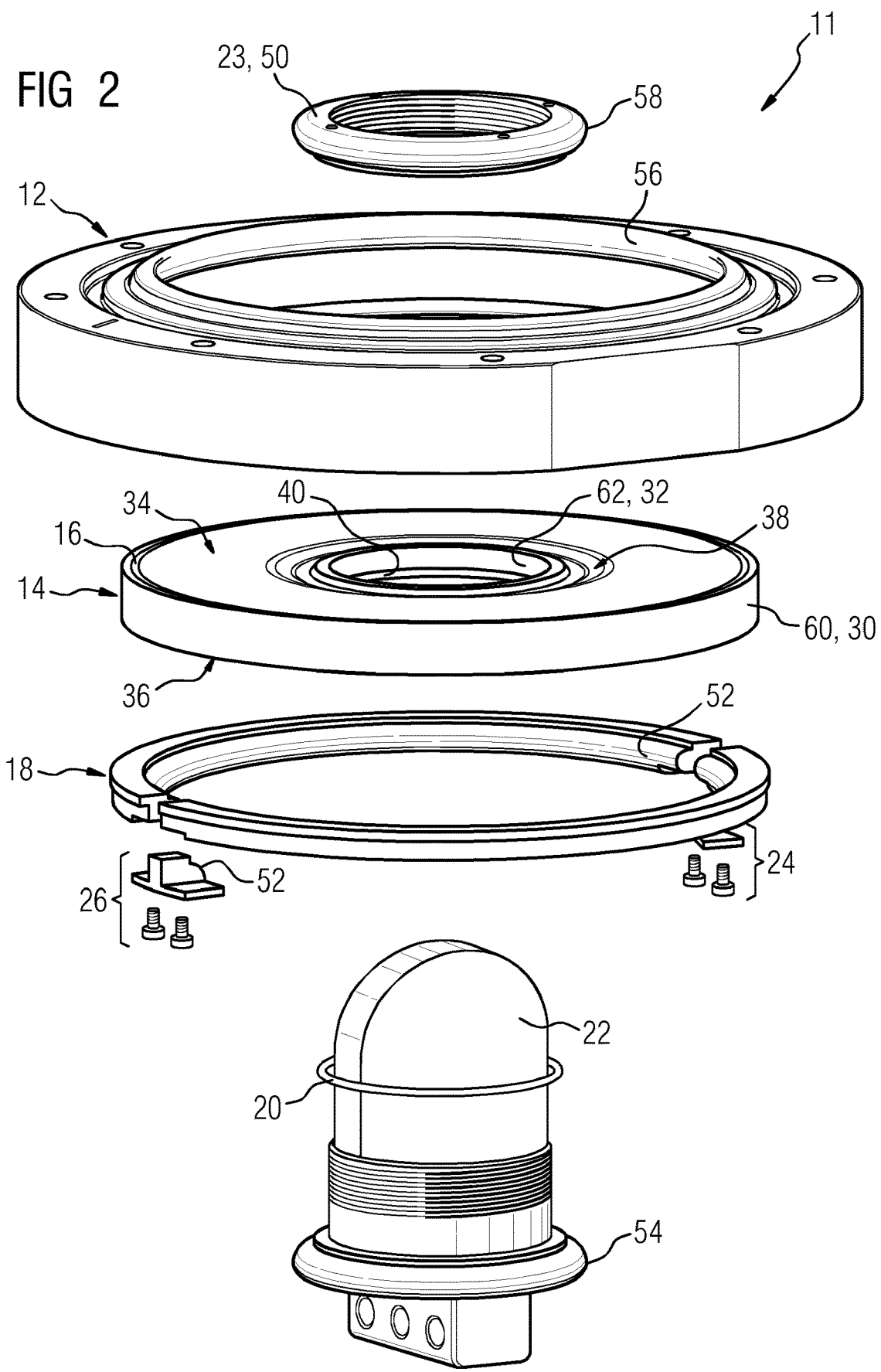
FIG. 2 shows an exploded drawing of an electrical bushing according to the invention.

FIG. 2 shows an exploded illustration of an electrical bushing 11 according to the invention. In this exploded drawing, in particular the individual component parts of the electrical bushing 11 can be seen clearly. The drawing also shows the direction of construction. Thus, the current conduction element 22 is guided from one side through the ceramic disk-shaped insulating element, whereas the fastening element 23 or the union nut 50 with an optional third control geometry is plugged on from the opposite side of the ceramic disk-shaped insulating element 14. The fastening element 23 or the union nut 50 keep the current conduction element 22 in the assembled state in the ceramic disk-shaped insulating element 14.

In order to achieve sufficient gastightness in the connection between the current conduction element 22 and the ceramic disk-shaped insulating element 14, a second sealing element 20 is provided.

The ceramic disk-shaped insulating element 14 having notches 38 (denoted by 44 and 48 in FIG. 1) in the ceramic disk-shaped insulating element 14 is mountable in floating fashion in the metallic outer ring 12 and is held, in the installed state, in the metallic outer ring 12 by the form-fitting insert ring 18. The form-fitting insert ring 18 in this case optionally has a fourth control geometry 52, which is provided on the at least one (two shown here) insert segments 24, 26 and is continued.

In order to achieve gastightness between the metallic outer ring 16 and the ceramic disk-shaped insulating element 14, a first sealing means 16 is provided.

Optionally, the electrical bushing 22 can have, in a widened section which serves to hold it in the ceramic disk-shaped insulating element 14, a second control geometry 54.

The metallic outer ring 12 can optionally have a first control geometry 56.

The outer faces 34, 36 of the ceramic disk-shaped insulating element 14 can optionally be polished, and the outer circumference, also outer diameter face, 60 and inner circumference, also inner diameter face, 62 of the disk-shaped insulating element 14 can optionally be machined by grinding.

Figure 3:
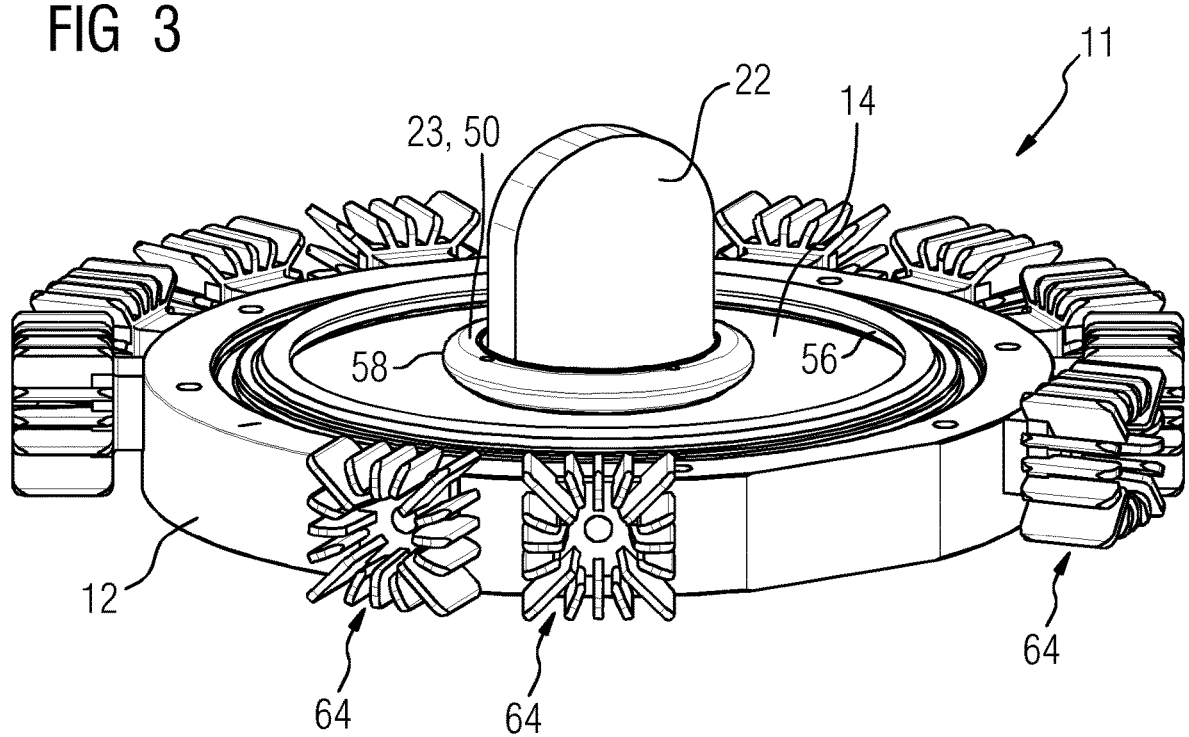
FIG. 3 shows an electrical bushing according to the invention having additional heat sinks.

FIG. 3 shows a further exemplary embodiment in a perspective illustration of an electrical bushing according to the invention. The electrical bushing is in principle constructed similarly to the electrical bushing shown in FIG. 2, wherein, in addition, one or more heat sinks 64 are provided on the metallic outer ring 12. The heat sinks 64 are arranged on the circumference of the outer diameter of the metallic outer ring 12 in order thus to be able to emit heat, in the installed state, not only to the two adjoining containers 66, 68, as are shown in FIG. 1, but also via the heat sinks 64.

The current conduction element 22 is plugged, as has already been described, through the inner diameter of the ceramic disk-shaped insulating element 14 and fastened therein by means of a fastening element 23 or a union ring 50.

Also shown is the first control geometry 56 on the metallic outer ring 12 and the third control geometry 58 on the fastening element 23 or union ring 50. The ceramic disk-shaped insulating element 14, which is held in the metallic outer ring 12, is also illustrated.

LIST OF REFERENCE SYMBOLS

1 gas-insulated switchgear assembly
4 insulating gas
11 electrical bushing
12 metallic outer ring
14 ceramic disk-shaped insulating element
15 groove for receiving the first sealing element
16 first sealing element
18 form-fitting insert ring
19 groove for receiving the second sealing element
20 second sealing element
22 current conduction element
23 fastening element
24, 26 insert segment
28 opening in the ceramic disk-shaped insulating element
30 outer diameter face of the ceramic disk-shaped insulating element
32 inner diameter face of the ceramic disk-shaped insulating element
34, 36 outer faces of the ceramic disk-shaped insulating element
38 notches in the ceramic disk-shaped insulating element
40 groove in the inner diameter face of the ceramic disk-shaped insulating element
42 ring-shaped field control element
44, 48 ring-shaped notch
50 union ring
52 fourth control geometry on the form-fitting insert ring and/or insert segment
54 second control geometry on the current conduction element
56 first control geometry on the metallic outer ring
58 third control geometry on the fastening element or union ring
60 outer circumference or outer diameter face of the ceramic disk-shaped insulating element, preferably machined by grinding
62 inner circumference or inner diameter face of the ceramic disk-shaped insulating element, preferably machined by grinding
64 heat sink
66, 68 container of the gas-insulated switchgear assembly
70, 72 connecting faces of the outer metal ring

The invention claimed is:

1. An electrical bushing for a switchgear assembly, the electrical bushing comprising:
    a metallic outer ring and a form-fitting insert ring disposed within said metallic outer ring;
    a disk-shaped insulating element formed of a ceramic material, said ceramic disk-shaped insulating element having an opening formed therein, an outer diameter face, an inner diameter face and two outer faces;
    a current conduction element received in said opening of said disk-shaped insulating element;
    a fastening element for connecting said current conduction element to said ceramic disk-shaped insulating element;
    said ceramic disk-shaped insulating element being connectable to said metallic outer ring and being mountable or mountable in floating fashion by way of said metallic outer ring and said form-fitting insert ring.

2. The electrical bushing according to claim 1, wherein said outer ring is a multi-part metallic outer ring or a single-part metallic outer ring and said insert ring is a single-part or multi-part form-fitting insert ring.

3. The electrical bushing according to claim 2, wherein said ceramic disk-shaped insulating element has a first sealing element and a second sealing element, said ceramic disk-shaped insulating element is connectable in gas-tight fashion to said metallic outer ring via said first sealing element, said current conduction element is connectable to said ceramic disk-shaped insulating element via said second sealing element and said fastening element, and said ceramic disk-shaped insulating element is mountable, or mountable in floating fashion, by way of said multi-part metallic outer ring or by way of said form-fitting insert ring and said single-part metallic outer ring.

4. The electrical bushing according to claim 1, wherein said form-fitting insert ring has at least one insert segment configured to mount, or mount in floating fashion, said ceramic disk-shaped insulating element, said at least one insert segment and said metallic outer ring.

5. The electrical bushing according to claim 4, which comprises one or more of the following control geometries:
    a first control geometry formed on an inner edge, opposite said form-fitting insert ring, of said metallic outer ring;
    a second control geometry on an outer edge, opposite an edge with said fastening element, of said current conduction element,
    a third control geometry on an edge of said fastening element or a union ring which points towards said metallic outer ring and away from said ceramic disk-shaped insulating element; and/or
    a fourth control geometry on said form-fitting insert ring and on the one or more insert segments on an edge which points away from said metallic outer ring and said ceramic disk-shaped insulating element, respectively.

6. The electrical bushing according to claim 1, wherein said ceramic disk-shaped insulating element has a groove formed in said inner diameter face for receiving a ring-shaped field control element in said groove.

7. The electrical bushing according to claim 1, which comprises a union ring forming said fastening element for fastening said current conduction element in said ceramic disk-shaped insulating element.

8. The electrical bushing according to claim 7, wherein said union ring is formed with an internal thread configured to mesh with an external thread formed on a circumference of said current conduction element.

9. The electrical bushing according to claim 1, wherein outer faces of said ceramic disk-shaped insulating element are polished or glazed, and an outer circumference and inner circumference of said ceramic disk-shaped insulating element are machined by grinding.

10. The electrical bushing according to claim 1, wherein said metallic outer ring is formed of a metal selected from the group consisting of aluminum, an aluminum alloy and stainless steel.

11. The electrical bushing according to claim 1, wherein said current conduction element is formed of a metal selected from the group consisting of copper, a copper alloy, aluminum and an aluminum alloy.

12. The electrical bushing according to claim 1, wherein said ceramic disk-shaped insulating element is formed of a material selected from the group consisting of aluminum oxide, aluminum nitride, AlN, beryllium oxide, boron nitride, magnesium oxide, silicon aluminum oxynitride, silicon carbide, silicon nitride, titanium nitride, titanium oxide, a mullite ceramic, and a mixed form of aluminum and silicon oxide.

13. The electrical bushing according to claim 12, wherein said ceramic disk-shaped insulating element is formed of $Al_2O_3$.

14. The electrical bushing according to claim 1, wherein said metallic outer ring carries, on an outer circumference thereof, one or more heat sinks, which extend(s) radially away from the outer circumference.

15. The electrical bushing according to claim 1, configured specifically for a gas-insulated switchgear assembly.

16. A switchgear assembly for low-voltage installations or medium-voltage installations or high-voltage installations, the switchgear assembly comprising an electrical bushing according to claim 1.

17. A switchgear assembly for low-voltage installations or medium-voltage installations or high-voltage installations, the switchgear assembly comprising an electrical bushing according to claim 1, and wherein at least a part of the switchgear assembly is filled or is fillable with an insulating gas.

18. The electrical bushing according to claim 1, wherein said form-fitting insert ring radially overlaps said insulating element.

19. The electrical bushing according to claim 1, wherein said form-fitting insert ring abut one of said outer faces.

20. An electrical bushing for a switchgear assembly, the electrical bushing comprising:
    a metallic outer ring and a form-fitting insert ring;
    a disk-shaped insulating element formed of a ceramic material, said ceramic disk-shaped insulating element having an opening formed therein, an outer diameter face, an inner diameter face and two outer faces;
    a current conduction element received in said opening of said disk-shaped insulating element;
    a fastening element for connecting said current conduction element to said ceramic disk-shaped insulating element;

said ceramic disk-shaped insulating element being connectable to said metallic outer ring and being mountable or mountable in floating fashion by way of said metallic outer ring and said form-fitting insert ring;

said ceramic disk-shaped insulating element being formed in each of said outer faces with a ring-shaped notch in a region of said ceramic disk-shaped insulating element in which three interfaces of an insulating gas, said current conduction element or said fastening element or a union nut and said ceramic disk-shaped insulating element meet.

\* \* \* \* \*